US00RE42667E

(19) United States
(12) Reissued Patent
Hammoud et al.

(10) Patent Number: US RE42,667 E
(45) Date of Reissued Patent: Sep. 6, 2011

(54) INTAKE VALVE TIMING IN MULTI-VALVE, CAMLESS ENGINES

(75) Inventors: Mazen Hammoud, Dearborn, MI (US); Mohammad Haghgooie, Superior Township, MI (US)

(73) Assignee: Ford Global Technologies, LLC, Dearborn, MI (US)

(21) Appl. No.: 11/874,111

(22) Filed: Oct. 17, 2007

Related U.S. Patent Documents

Reissue of:
(64) Patent No.: 6,553,961
Issued: Apr. 29, 2003
Appl. No.: 09/730,067
Filed: Dec. 5, 2000

U.S. Applications:
(62) Division of application No. 11/119,496, filed on Apr. 28, 2005.

(51) Int. Cl.
*F02B 31/00* (2006.01)
*F01L 1/00* (2006.01)

(52) U.S. Cl. ..... 123/308; 123/90.1

(58) Field of Classification Search ..... 123/308, 123/90.1, 90.15, 90.16, 306, 432, 90.11, 123/321, 322, 345–348
See application file for complete search history.

(56) References Cited

U.S. PATENT DOCUMENTS

| | | | |
|---|---|---|---|
| 5,072,700 | A | 12/1991 | Kawamura |
| 5,558,060 | A | 9/1996 | Horie et al. |
| 5,575,254 | A | 11/1996 | Tsuchida et al. |
| 5,595,156 | A | 1/1997 | Tsuzuku |
| 5,669,341 | A | 9/1997 | Ushirono et al. |
| 5,839,400 | A | 11/1998 | Vattaneo et al. |
| 5,878,714 | A | 3/1999 | Dai et al. |
| 5,913,298 | A | 6/1999 | Yoshikawa |
| 5,970,963 | A | 10/1999 | Nakasa et al. |
| 6,006,718 | A | 12/1999 | Ishihara et al. |
| 6,009,841 | A | 1/2000 | Hickey |
| 6,553,961 | B2 | 4/2003 | Hammoud et al. |

OTHER PUBLICATIONS

U.S. Appl. No. 11/119,496, filed Apr. 28, 2005, Hammoud et al.
Kluting, Manfred et al. "Throttle-free load control with fully variable valve drives (Drosselfreie Laststeuerung mit vollvariablen Ventiltrieben)." MTZ—Motortechnische Zeitschrift (magazine), Aug. 1999.

*Primary Examiner* — John T Kwon
(74) *Attorney, Agent, or Firm* — Allan J. Lippa; Alleman Hall McCoy Russell & Tuttle LLP

(57) ABSTRACT

Two intake valves are independently operated by electromechanical actuators and activated by the engine electronic controller. One tumble-type intake valve and one conventional intake valve are provided in each cylinder. The valve members are individually opened and closed to achieve a desired air flow pattern in the combustion chamber to optimize combustion which increases fuel economy and reduces undesirable emissions. The opening and closing of the valve members depends on the engine speed, engine load, and other factors.

60 Claims, 2 Drawing Sheets

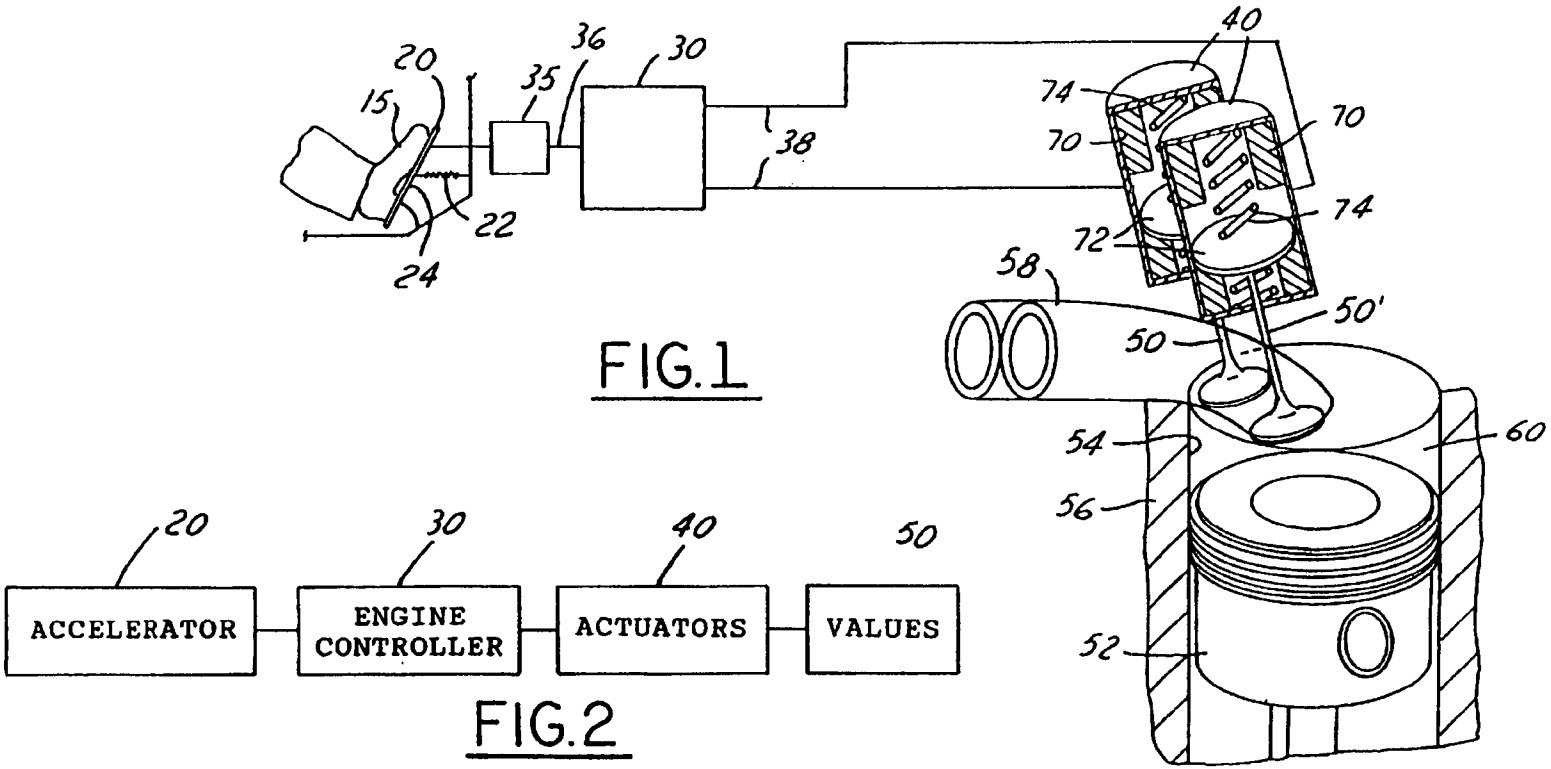
FIG.1
FIG.2
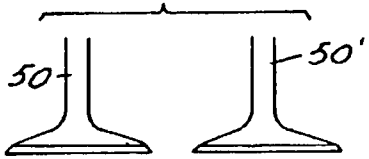
FIG.3C
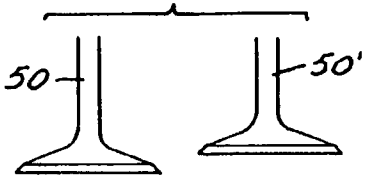
FIG.3B
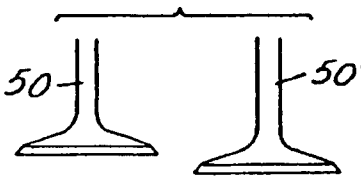
FIG.3A

INTAKE VALVE TIMING IN MULTI-VALVE, CAMLESS ENGINES

Matter enclosed in heavy brackets [ ] appears in the original patent but forms no part of this reissue specification; matter printed in italics indicates the additions made by reissue.

*CROSS REFERENCE TO RELATED APPLICATION*

*This application is a divisional of reissue application Ser. No. 11/119,496, filed Apr. 28, 2005, which is a reissue of U.S. Pat. No. 6,553,961, which was filed Dec. 5, 2000, and issued Apr. 29, 2003.*

TECHNICAL FIELD

The present invention relates to intake valve systems for multi-valve engines, and more particularly to methods and apparatus for securing desired air-fuel mixture turbulence level in the combustion chamber in order to achieve optimum combustion.

BACKGROUND

It is a common goal with vehicle manufacturers today to provide engine and combustion systems which improve fuel economy and, at the same time, reduce undesirable emissions. There are many systems which have been developed which accomplish one or more of these goals and achieve satisfactory results. Some of these systems include, for example, supplying prespecified amounts of fuel and air during certain engine operating conditions, various combustion chamber configurations including shaped bowls in the piston crown in order to secure desired air-fuel mixture and motion under various operating conditions, intake and exhaust valve mechanisms which create desired tumble and/or swirl patterns of in-cylinder flow motion, air-fuel mixture stratifications in the combustion chamber, and the like. Some of these systems are used in particular for direct injection spark ignited (DISI) engines.

Charge motion in the combustion chamber is an important factor for generating turbulence which in turn enhances the burn rate in engines. However, the tumble and/or swirl generation often comes at the expense of discharge coefficient, thus reducing the maximum power output of the engine.

Thus, there is a need for an engine combustion system which creates the desired turbulence in the combustion chamber and yet does not degrade the discharge coefficient.

SUMMARY OF THE INVENTION

It is an advantage of the present invention to provide an improved combustion system for an engine.

It is another advantage of the present invention to provide a high turbulence flow field in the combustion chamber without degrading the discharge coefficient or reducing the maximum output power of the engine.

It is a further advantage of the present invention to provide a combustion system which secures high fuel efficiency and at the same time reduces undesirable emissions.

The present invention provides a system and apparatus for achieving these advantages by generating high turbulence levels in the combustion chamber without degrading the discharge coefficient. In accordance with the present invention, a multi-valve engine is provided with at least two independently operated intake valves in each cylinder. One intake port is designed for generation of tumble flow while the other is designed for conventional cylinder filling with high flow efficiency. A high swirl and tumble flow, which decays to in-cylinder turbulence during induction and compression, is provided in the combustion chamber by delaying or advancing the opening of one intake valve relative to the other. Each of the intake valves is operated by an electro-mechanical actuator, or electro-hydraulic actuator, which in turn is activated by the engine controller.

At light load conditions, the necessary mixture motion is generated with the intake valve timing to improve burn rate and thermal efficiency. The tumble valve can be disabled allowing only a swirl flow to be generated in the cylinder. At slightly higher load conditions, a combined tumble and swirl flow can be generated. This is accomplished either by opening the conventional valve for a portion of the process to initial swirl and then opening both valves, or by opening the tumble valve alone to generate a negative direction inclined swirl. At still higher load conditions (i.e. mid-load conditions), the opening and closing of the valves is timed for tumble flow generation. At full load conditions, both valves are opened and closed at conventional timings to provide the requisite high flow rate and therefore maximize output power.

The present invention has the flexibility to achieve the proper timing of the opening and closing of the intake valves to secure optimum combustion of the fuel under all operating conditions. The opening and closing of the intake valves is varied by the engine controller and is dependent on the engine speed and engine load.

BRIEF DESCRIPTION OF THE DRAWINGS

FIG. 1 depicts the overall system in accordance with the present invention;

FIG. 2 is a schematic illustration of the various components of the present invention;

FIGS. 3A, 3B, and 3C illustrate representative operation of the intake valves;

DESCRIPTION OF THE PREFERRED EMBODIMENT(S)

Figure 4:
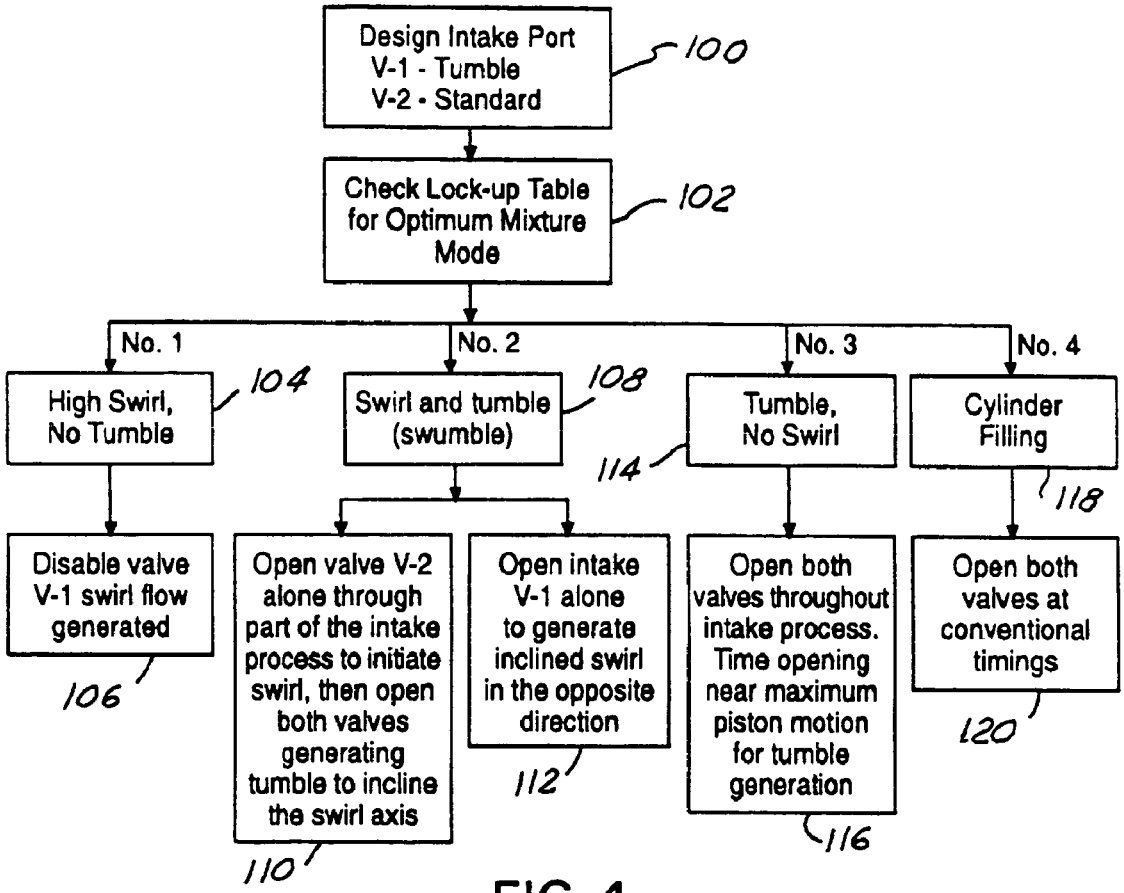
FIG. 4 is a flow diagram depicting the general manner in which the intake valves are operated under certain load conditions in order to optimize the mixture motion mode.

The formation of swirl or tumble motion of air/fuel mixtures in combustion chambers is important for increasing the burn rate of the fuel in spark ignited engines. In tumble, the inducted air rotates about an axis perpendicular to the axis of the cylinder. Swirling air flow motion has its axis of rotation parallel to the cylinder axis. Finally, the word "swumble" denotes in-cylinder flow motion with an axis of rotation inclined relative to the cylinder axis.

In many cases, the generation of the tumble and/or swirl flows of air comes at the expense of reducing the discharge coefficient of the flow through the valve by masks or other obstructions to flow being placed in the vicinity of the valve opening. Thus, the power output of the engine is reduced or degraded. The present invention generates high swirl and tumble air flows by delaying or advancing the opening of one intake valve relative to the other in the multi-valve engine and does not degrade the discharge coefficient.

At low flow rate conditions, that is, at low engine speed and light load, one of the intake valves is deactivated to generate a charge motion which provides adequate mixing and robust combustion. Robust combustion is necessary to provide stable combustion, which results in high efficiency and low emission of unburned fuel.

At full load conditions, where the demand is for maximum engine power, the timing of the valves is arranged to provide maximum air flow into the combustion chamber. More in-cylinder charge results in more engine output power.

The components and system of the present invention are shown in FIG. 1. A schematic illustration of the various components of the system is shown in FIG. 2. FIGS. 3A-3C depict a representative operation of the intake valves.

In use, the present invention is responsive to the demands of the operator. In this regard, the operator will activate the engine accelerator pedal at 20 which in turn will send a signal to the engine control unit (ECU) 30 indicating operator demand. A spring member 22 is secured to the accelerator pedal 24 in order to provide a tactile feedback to the engine operator 15.

The movement of the accelerator pedal 24 may be registered in an accelerator response mechanism 35 which correlates the linear movement of the accelerator pedal into an appropriate signal 36 and signals from other conventional sensors, such as an engine speed sensor (not shown) and/or an engine temperature sensor (not shown), the ECU sends appropriate signals 38 to the valve actuators 40 which operate the intake valves 50 and 50'.

As indicated, the present invention is used with multi-valve engines. These are engines which have at least two intake valves in each of the cylinders of the engine. In the schematic illustration shown in FIG. 1, a representative piston 52 is positioned in a cylinder 54 in an engine 56 installed into a vehicle. The two intake valves 50 and 50' are positioned at the interface of air intake passageway 58 and the engine cylinder 54. A fuel injector (not shown) is used to introduce fuel into the upper area 60 of the cylinder 54, either into and through the air inlet passageways, or directly into the combustion chamber. A spark plug (not shown) is positioned in the cylinder 54 to provide the necessary ignition source for the fuel introduced into the combustion chamber 60.

The electromechanical actuators 40 include solenoid members 70 which are used to longitudinally activate armature members 72 attached to the ends of the intake valve members 50 and 50'. Coil spring members 74 are used to bias the valve intake members 50 and 50' toward their closed or seated positions in the cylinder head. In the closed or seated positions, the intake valve members do not allow air in the intake passageway 58 to enter the combustion chamber 60.

As shown in FIGS. 3A, 3B, and 3C, one or both of the intake valve members 50, 50', can be raised (closed) or lowered (opened) depending upon the engine speed and load. In FIG. 3A, intake valve member 50' is opened allowing air to flow from the intake passageway into the combustion chamber, while intake valve member 50 remains in its closed or seated position. This creates a particular pattern of air flow in the combustion chamber 60, depending on the size, position, and angle of inclination of the air passageway 58 and other factors including the pressure drop across the valve 50.

In FIG. 3B, intake valve member 50 is in its open position, while intake valve member 50' is in its closed or seated position. This configuration creates another air flow configuration in the combustion chamber, again depending on the particular size and configuration of the air intake passageway. Finally, in FIG. 3C, both valve intake members 50 and 50' are shown in their open (lowered) conditions. This allows the maximum amount of air to enter the combustion chamber and further results in another air flow configuration in the combustion chamber.

Further, time phasing of opening and closing the valve members relative to each other, can create additional air flow patterns in the combustion chamber.

To determine the appropriate air flow or turbulence in the combustion chamber, the particular engine in question is evaluated and analyzed. The opening and closing of the valve members, and the particular degree of opening and sequence of opening of one valve member relative to the other can be determined to achieve the optimum combustion of the fuel in the combustion chamber under all operating conditions of the engine. Optimum combustion can be determined based on minimizing fuel consumption, minimizing emissions, maximizing stability, improving other factors, or a combination criteria. The inventors of the present invention have recognized that the camless engine has the necessary flexibility in valve timing to optimized combustion of the engine at all operating conditions.

A multi-valve engine with independently controlled valves, as shown, has a number of advantages. The number of operating valves at any given speed or load can be selected to optimize the energy consumption and performance. A multitude of flow patterns can be accessed with the flexible operating characteristics of the engine so that predominantly swirl, predominantly tumble, and swumble flow can be formed.

A flow diagram depicting the general manner in which the intake valves can be operated under certain load conditions to optimize the mixture motion mode and increase fuel economy is shown in FIG. 4. As a first step 100, the two intake ports are provided such that one creates tumble flow (V-1) while the other is a standard conventional intake port (V-2). For a tumble-type intake port, typically the intake channel is configured to introduce air into the cylinder in a substantially vertical direction. Tumble-type intake ports are well known in the art and any conventional design can be utilized.

Figure 5:
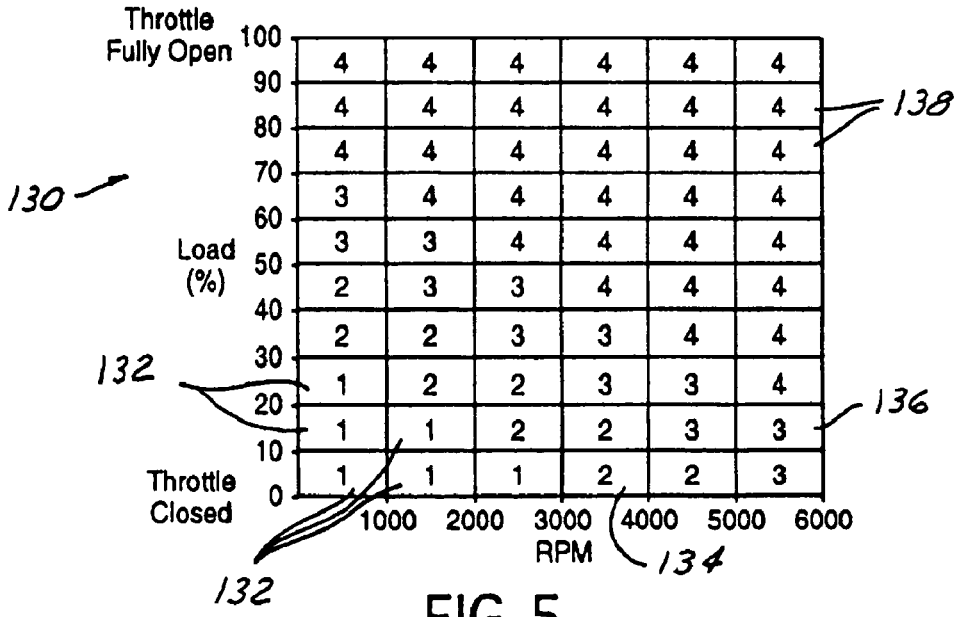
FIG. 5 illustrates a representative look-up table for use with the present invention.

At this point, a look-up table 102 is utilized to determine the optimum mixture mode for the engine. The optimum mixture mode depends on one or more operating conditions of the engine, for example, the load generated by the engine and the location of the piston relative to the crank angle. A representative look-up table 130 is shown in FIG. 5. A specific look-up table will be generated for each engine or type of engine and will result in various valve open and closing configurations depending on the load percentage and rpm (revolutions per minute) of that particular engine. In this regard, each engine design is calibrated to find the optimum mixture motion mode for that particular engine. A look-up table is then generated and utilized to provide the requisite operating condition (e.g. Nos. 1-4) to maximize combustion and thereby increase fuel efficiency and reduce emissions. In the look-up table 130, condition number one ("1") is utilized where the load is 30 percent or less and the rpm is 3,000 or less. As the load and rpm increase, the condition changes to numbers 2, 3, and 4 as indicated. These are indicated also by reference numerals 132, 134, 136 and 138, respectively, in FIG. 5, and correspond to "No. 1," "No. 2," "No. 3," and "No. 4," respectively in FIG. 4.

With the present invention, a full control of the fluid motion within the cylinders of the engine is provided which results in improved combustion of fuel in the engine. This, in turn, increases the fuel economy of the engine, as well as decreasing undesirable emissions.

At load condition No. 1, which is idle condition, the optimum mixture mode, as shown in box 104, has high swirl without any tumble motion. This is generated by disabling the tumble intake valve in port V-1, as shown in Box 106, and allowing a swirl flow motion to be generated in the cylinder. This improves idle stability and increases the initial flame kernel growth. Robust combustion depends on the early flame growth.

Load condition No. 2 is a light-load condition. For optimum air/fuel motion in the cylinder, a combined swirl and tumble motion (swumble) is provided 108. As shown in Box 110, only the conventional intake valve in port V-2 is opened through a portion of the intake process to initiate a swirl motion in the cylinder. Thereafter, both valves are opened, which allows the tumble motion to incline the swirl axis. As an example, port valve V-2 can be opened when the piston is from −45° to +45° before top dead center (TDC) and port valve V-1 can be opened when the piston is at 80° before TDC.

An alternate procedure for light-load conditions is shown in Box 112. Under this procedure, the tumble valve (port valve V-1) is opened by itself. This generates an inclined swirl air/fuel motion in the negative or opposite direction. In this regard, under both conditions 110 and 112, an air-fuel mixture having a tilted or inclined swirl motion is generated, although in opposite directions.

At still higher-load conditions (condition No. 3), which are also called mid-load conditions, a tumble motion 114 is generated in the engine cylinders. Mid-load conditions can result, for example, when the engine is operating under constant speed conditions, such as traveling on an expressway. As shown in Box 116, both valves are opened at the same time throughout the intake process. The opening of the valves is timed to coincide with maximum piston motion to generate the requisite tumble motion. For example, both valves are closed when the piston is at bottom dead center (BDC), both valves, are opened from 100° to −75° before TDC, and both valves are closed thereafter.

During midrange power conditions, only about 50% of the air which could be inducted by the engine is required to develop this load. With the present invention, improved dilution tolerance is provided; that is, due to higher mixture motion, a greater amount of dilution with exhaust gases can be added to the combustion gases without impairing combustion stability. Higher levels of dilution with exhaust gases helps reduce $NO_x$ emissions and makes the engine more efficient, the latter benefit largely due to reduced pumping losses.

The full load condition is shown as the No. 4 condition in FIG. 4 and indicated by the reference numeral 118. Full load conditions can result, for example, when the vehicle is accelerating to pass another vehicle or traveling uphill. At this point, as shown in Box 120, both valves are opened at timings to maximize air induction quantity. The flow rate through the intake ports into the cylinder is greatest at full load and the turbulence level of the mixture inducted into the cylinder is high. There is no need to induce a large scale flow structure, such as tumble or swirl, which persists in the cylinder until the time of spark. The combustion difficulty encountered at high load operating conditions tends to be combustion harshness which is a result of combustion occurring at too rapid a rate. This is countered by reducing the turbulence level in the cylinder, which is a measure which leads to maximum induction of air. This improves maximum power from the engine.

Although specific configurations of air passageways and intake valve members are shown, it is understood that the present invention can be utilized in any multi-valve engine having any form of air passageways or intake valve members. Also, the electromechanical activators 40 shown in the drawings are by way of example only. Any known or equivalent type of activators for opening and closing intake valve members can be utilized, and the present invention is not restricted to any particular one of them.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method for generating turbulence of an air-fuel mixture in a combustion chamber of a multi-valve engine, said engine having at least first and second intake valve members each independently activated by an actuator member, with the activation of the actuator member being controlled by an engine controller unit, the method comprising the steps of:

determining a first operating condition, a second operating condition, and a third operating condition of the engine;

separately operating the intake valve members to generate an air-fuel turbulence in the engine combustion chamber corresponding at least [In] *in* part to the first, second and third operating conditions, so that under a first operating condition a high swirl, no tumble turbulence is formed, under a second operating condition a swirl and tumble turbulence is formed, and under a third operating condition a tumble, no swirl turbulence is formed;

wherein the optimum air-fuel turbulence is created for the operating condition to maximize fuel efficiency and minimize undesirable emissions.

2. The method for generating turbulence as set forth in claim 1 wherein a look-up table is utilized to operate the actuator members and accompanying intake valve members depending on engine load and speed.

3. The method for generating turbulence as set forth in claim 1 wherein said intake valve members are operated in accordance with a look-up table which has been established for the engine.

4. The method for generating turbulence as set forth in claim 1 wherein said first intake valve member is a tumble-type intake valve member.

5. The method for generating turbulence as set forth in claim 1 wherein said second intake valve member is a conventional intake valve member.

6. The method for generating turbulence as set forth in claim 1 wherein said first intake valve member is a tumble-type intake valve member and said second intake valve member is a conventional intake valve member.

7. The method for generating turbulence as set forth in claim 6 wherein in light-load conditions of the engine, said first valve member is disabled and only said second valve is operated.

8. The method for generating turbulence as set forth in claim 6 wherein in light-load conditions of the engines, said first valve member is disabled and a swirl air flow motion is generated in the combustion chamber.

9. The method for generating turbulence as set forth in claim 6 wherein in a first mid-load condition, an inclined swirl air flow motion is generated in the combustion chamber.

10. The method for generating turbulence as set forth in claim 9 wherein said inclined swirl air flow is generated by first opening said second valve for a first portion of the intake process and then concurrently opening said first valve for a second portion of the intake process.

11. The method for generating turbulence as set forth in claim 9 wherein said second valve is disabled.

12. The method for generating turbulence as set forth in claim 1 wherein in a second mid-load condition of the engine, a tumble air flow motion is generated in the combustion chamber.

13. The method for generating turbulence as set forth in claim 12 wherein said tumble air flow motion is generated by timing the openings of both of said first and second valve members during the intake process.

14. The method for generating turbulence as set forth in claim 1 wherein in a full-load condition of the engine, both of said first and second valve members are operated at conventional timings for the engine.

15. A process for optimizing the air-flow motion in the cylinder combustion chambers of a multi-valve engine, each of said cylinders having a first intake valve and a second intake valve, both of said first and second intake valves being individually and independently operated, and the engine having an electronic controller for operating said first and second intake valves, said process comprising the steps of:

establishing a plurality of operating conditions for the engine based on engine load and speed;

preparing a look-up table based on said plurality of operating conditions;

operating said first and second intake valves depending on the look-up table relative to a first engine load and speed; and generating an air flow motion in the cylinder combustion chamber corresponding to one of said plurality of operating conditions, so that under a first operating condition of said plurality of operating conditions a high swirl, no tumble turbulence is formed, under a second operating condition of said plurality of operating conditions a swirl and tumble turbulence is formed [and], and under a third operating condition of said plurality of operating conditions a tumble, no swirl turbulence is formed.

16. A system for generating turbulence of an air-fuel mixture in a combustion chamber of a multi-valve engine, said engine having at least first and second intake valve members, and a controller unit, said system comprising:

means for determining a first operating condition, a second operating condition, and a third operating condition of the engine;

means for separately operating said first and second intake valve members in order to generate a desired air-fuel turbulence in the engine combustion chamber corresponding at least in [pan] *part* to said first, second and third operating conditions, so that under a first operating condition a high swirl, no tumble turbulence is formed, under a second operating condition a swirl and tumble turbulence is formed, and under a third operating condition a tumble, no swirl turbulence is formed;

wherein an optimum air fuel turbulence is created for said operating condition to maximize fuel efficiency and minimize undesirable emissions.

17. The system as set forth in claim 16 wherein said means for determining an operating condition comprises a look-up table.

18. The system as set forth in claim 16 wherein said first intake valve member is a tumble-type intake valve member and said second intake valve member is a conventional intake valve member.

19. The system as set forth in claim 16 wherein a plurality of operating conditions are established for the engine based on engine load and engine speed and said first and second intake valve members are separately operated in accordance with one of said operating conditions in order to generate a corresponding air flow motion in the combustion chamber.

20. The system as set forth in claim 17 wherein said look-up table contains a plurality of operating conditions for the engine based on engine load and engine speed, and said first and second intake valve members are separately operated in accordance with one of said operating conditions in order to generate a corresponding air flow motion in the combustion chamber.

*21. A multi-valve engine for a vehicle, the multi-valve engine comprising:*

*at least one cylinder including:*

*a combustion chamber;*

*an air intake passageway;*

*a first intake valve positioned at the interface of the combustion chamber and the air intake passageway;*

*a first electromechanical actuator configured to operate the first intake valve;*

*a second intake valve positioned at the interface of the combustion chamber and the air intake passageway; and*

*a second electromechanical actuator configured to operate the second intake valve;*

*a controller configured to independently operate each intake valve via the first and second electromechanical actuators;*

*the controller being further configured to produce time phasing of the opening and closing of the valve members relative to each other during the intake stroke;*

*where variable operation of the first and second intake valves produces varying amounts of swirl and/or tumble turbulence.*

*22. The multi-valve engine of claim 21, where the first intake valve member is a conventional intake valve member.*

*23. The multi-valve engine of claim 21, where the second intake valve member is a tumble-type intake valve member.*

*24. The multi-valve engine of claim 21, where the first intake valve member is a conventional intake valve member and the second intake valve member is a tumble-type intake valve member.*

*25. The multi-valve engine of claim 21, where a high swirl, no tumble turbulence is formed by operating the first valve member without operating the second valve member.*

*26. The multi-valve engine of claim 21, where a swirl and tumble turbulence is formed by operating the first and second valve members.*

*27. The multi-valve engine of claim 21, where a high tumble, no swirl turbulence is formed by operating the second valve member without operating the first valve member.*

*28. The multi-valve engine of claim 21, where an inclined swirl air flow motion is generated by first opening the first valve for a first portion of the intake process and then concurrently opening the second valve for a second portion of the intake process.*

*29. An electromechanical valve control system for a multi-valve engine for a vehicle, the control system comprising:*

*a cylinder including*

*a first electromechanically-operated intake valve; and*

*a second electromechanically-operated intake valve;*

*a controller in electronic communication with the first and second intake valves, the controller being configured to receive information related to the operating condition of the vehicle and independently operate the first and second intake valves in response to the operating condition;*

*where, under a first operating condition, the first intake valve is operated and the second intake valve is not operated, and under a second operating condition, the second intake valve is operated and the first intake valve is not operated; and*

*where variable operation of the first and second intake valves produces varying amounts of swirl and/or tumble turbulence.*

*30. The multi-valve engine of claim 29, where the first intake valve member is a conventional intake valve member.*

*31. The multi-valve engine of claim 29, where the second intake valve member is a tumble-type intake valve member.*

*32. The multi-valve engine of claim 29, where the first intake valve member is a conventional intake valve member and the second intake valve member is a tumble-type intake valve member.*

*33. The multi-valve engine of claim 29, where a high swirl, no tumble turbulence is formed by operating the first valve member without operating the second valve member.*

*34. The multi-valve engine of claim 29, where a swirl and tumble turbulence is formed by operating the first and second valve members.*

*35. The multi-valve engine of claim 29, where a high tumble, no swirl turbulence is formed by operating the second valve member without operating the first valve member.*

*36. The multi-valve engine of claim 29, where an inclined swirl air flow motion is generated by first opening said first valve for a first portion of the intake process and then concurrently opening said second valve for a second portion of the intake process.*

*37. A multi-valve engine for a vehicle, the multi-valve engine comprising:*

*at least one cylinder including:*

*a combustion chamber;*

*an air intake passageway;*

*a first intake valve positioned at the interface of the combustion chamber and the air intake passageway;*

*a first electromechanical actuator configured to operate the first intake valve;*

*a second intake valve positioned at the interface of the combustion chamber and the air intake passageway; and*

*a second electromechanical actuator configured to operate the second intake valve;*

*a controller configured to independently operate each intake valve via the first and second electromechanical actuators; and*

*the controller being further configured to produce time phasing of the opening and closing of the valve members relative to each other during an intake stroke.*

*38. The multi-valve engine of claim 37, where the time phasing produces a delay in the operation of the first intake valve relative to the second under a first predetermined operating condition.*

*39. The multi-valve engine of claim 37, where the time phasing produces a delay in the operation of the second intake valve relative to the first under a second predetermined operating condition.*

*40. The multi-valve engine of claim 39, where the controller is further configured to prevent operation of the first intake valve under a third predetermined operating condition.*

*41. The multi-valve engine of claim 40, where the controller is further configured to prevent operation of the second intake valve under a fourth predetermined operating condition.*

*42. The multi-valve engine of claim 37, where solo operation of the first valve is configured to produce a first flow pattern.*

*43. The multi-valve engine of claim 37, where solo operation of the second valve is configured to produce a second flow pattern.*

*44. The multi-valve engine of claim 37, where simultaneous operation of the first and second valves is configured to produce a third flow pattern.*

*45. The multi-valve engine of claim 37, where delayed operation of the first valve relative to the second is configured to produce a fourth flow pattern.*

*46. The multi-valve engine of claim 37, where delayed operation of the second valve relative to the first is configured to produce a fifth flow pattern.*

*47. An electromechanical valve control system for a multi-valve engine for a vehicle, the control system comprising:*

*a cylinder including*

*a first electromechanically-operated intake valve; and*

*a second electromechanically-operated intake valve;*

*a controller in electronic communication with the first and second intake valves, the controller being configured to receive information related to the operating condition of the vehicle and independently operate the first and second intake valves in response to the operating condition;*

*wherein, under a first operating condition, the first intake valve is operated and the second intake valve is not operated; and under a second operating condition, the second intake valve is operated and the first intake valve is not operated.*

*48. The multi-valve engine of claim 47, where solo operation of the first valve is configured to produce a first flow pattern.*

*49. The multi-valve engine of claim 47, where solo operation of the second valve is configured to produce a second flow pattern.*

*50. The multi-valve engine of claim 47, where simultaneous operation of the first and second valves is configured to produce a third flow pattern.*

*51. The multi-valve engine of claim 47, where delayed operation of the first valve relative to the second is configured to produce a fourth flow pattern.*

*52. The multi-valve engine of claim 47, where delayed operation of the second valve relative to the first is configured to produce a fifth flow pattern.*

*53. A method for operating a multi-valve engine under various operating conditions, the multi-valve engine including at least one cylinder having at least a first and a second electrically-controlled intake valve, the method comprising:*

*under a first vehicle operating condition, operating the first intake valve but not the second; and*

*under a second vehicle operating condition, operating the second intake valve but not the first.*

*54. The method of claim 53 further comprising:*

*under a third vehicle operating condition, time phasing the operation of the first and second intake valves relative to each other during an intake stroke.*

*55. The method of claim 54 where the step of time phasing the operation of the first and second intake valves relative to each other comprises delaying operation of the first or second intake valve in relation to the other during an intake stroke.*

*56. The method of claim 53 further comprising:*

*under a fourth vehicle operating condition, opening the first intake valve to a lesser or greater extent than the second intake valve.*

*57. A method for operating a multi-valve engine under various operating conditions, the multi-valve engine including at least one cylinder having at least a first and a second electrically-controlled intake valve, the method comprising:*

*under a first operating condition, time phasing the operation of the first and second valves relative to each other during an intake stroke.*

*58. The method of claim 57, where the step of time phasing the operation of the first and second valves relative to each other comprises delaying the timing of operation of the first or second intake valve in relation to the timing of the other.*

*59. The method of claim 58, where delaying operation of the timing of the first intake valve relative to the timing of the second intake valve produces a first flow pattern.*

*60. The method of claim 59, where delaying operation of the timing of the second intake valve relative to the timing of the first intake valve produces a second flow pattern.*

* * * * *